US006013617A

United States Patent [19]

Boittiaux et al.

[11] Patent Number: 6,013,617

[45] **Date of Patent: *Jan. 11, 2000**

[54] $Q_2/Q_3$ ALKALI METAL SILICATE/ INORGANIC COMPOUND DETERGENT BUILDERS

[75] Inventors: Patrick Boittiaux, Saint Mande; Daniel Joubert, Vineuil Saint Firmin; Pascal Taquet, Villers sous Saint Leu; Jean-Claude Kiefer, Precy/S/Oise, all of France; Jerome Le Roux, Wilfersdorf, Austria

[73] Assignee: Rhone-Poulenc Chimie, Courbevoie Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/588,933

[22] Filed: Jan. 19, 1996

[51] Int. Cl.[7] ............................... C11D 7/14; C11D 7/12; C01B 33/32

[52] U.S. Cl. .................... 510/509; 252/174.14; 423/332; 423/333; 510/221; 510/233; 510/337; 510/276; 510/511; 510/531

[58] Field of Search .................................... 510/509, 511, 510/531, 233, 221, 337, 276; 252/174.14; 423/332, 333

[56] References Cited

U.S. PATENT DOCUMENTS

| | | | |
|---|---|---|---|
| 2,046,192 | 6/1936 | Snell . | |
| 2,282,018 | 5/1942 | Baker | 510/531 |
| 2,284,248 | 5/1942 | Baker et al. | 510/531 |
| 2,909,490 | 10/1959 | Metziger . | |
| 3,257,325 | 6/1966 | Köster et al. | 510/531 |
| 3,687,640 | 8/1972 | Sams et al. | 510/531 |
| 3,821,119 | 6/1974 | Temple | 510/531 |
| 4,022,704 | 5/1977 | Balfanz et al. | 510/531 |
| 4,169,806 | 10/1979 | Davis et al. . | |
| 4,196,093 | 4/1980 | Clarke et al. . | |
| 4,473,485 | 9/1984 | Greene . | |
| 4,518,516 | 5/1985 | Godurd et al. | 510/531 |
| 4,761,248 | 8/1988 | Clift . | |
| 4,783,281 | 11/1988 | Bishop et al. | 510/531 |
| 4,973,419 | 11/1990 | Romeo et al. . | |
| 4,996,001 | 2/1991 | Ertle et al. | 510/531 |
| 5,300,250 | 4/1994 | Morgan et al. | 510/531 |
| 5,338,528 | 8/1994 | Sörensson et al. | 510/531 |
| 5,547,603 | 8/1996 | Sörensson et al. | 510/531 |
| B1 4,427,417 | 4/1985 | Porasik . | |

FOREIGN PATENT DOCUMENTS

| | | |
|---|---|---|
| 486 078 | 11/1990 | European Pat. Off. . |
| 488868 B1 | 2/1996 | European Pat. Off. . |
| 1031645 | 6/1966 | United Kingdom . |
| 1338850 | 11/1973 | United Kingdom . |
| 1396215 | 6/1975 | United Kingdom . |
| 93/04154 | 4/1993 | WIPO . |

OTHER PUBLICATIONS

"Soluble Silicates", by J.G. Vail vol. 2, Chapter 6, pp. 1 to 8. Woellner Company Product Literature (1997–1988) for Sikalun 2010 CARB.

"Structure of Alkaline Silicate Solutions", by H. Roggendorf, Final Report Prepared in Apr. 30, 1988 by Fraunhafer—Institute For Silicateforschung, pp. 4, 7, 14–16 and Figs. 6–9.

Paper presented to the Second World Conference on Detergents, Montreaux, Switzerland, Oct. 5–10, 1986, by Scowen and Welch of Unilever, pp. 81 and 87.

Chemical Week International, Jan. 31, 1990, pp. 48 and 52.

Chemical Week International, Jan. 29, 1992, p. 36.

Crossfield Chemicals Brochure Extract (1987), month unknown.

"The manufacture of soaps, other detergents and glycerine," by Edgar Woollatt (Extract) (1985), month unknown.

Chemical Engineers' Handbook (5th Ed) (Editors—Perry, R.H. and Chilton, C.H.) (1973), month unknown.

Perspectives in molecular sieve science, (Editors—Flank, W.H. and Whyte, T.E.) (1988), month unknown.

de Jong, B.H.W.S. et al., J. Non–crystalline Solids 123, 170–175 (1990), month unknown.

English–language translation of opposed European Patent No. 488868, Feb. 21, 1996.

*Primary Examiner*—Margaret Medley
*Attorney, Agent, or Firm*—Burns, Doane, Swecker & Mathis, L.L.P.

[57] ABSTRACT

Pulverulent detergent compositions, particularly suitable for washing and dishwashing machines, include a surfactant and a builder therefor, such builder comprising an alkali metal silicate advantageously having a $SiO_2/M_2O$ molar ratio ranging from about 1.6 to 3.5, at least 30% and preferably at least 50% of the silicon atoms of which being in the $Q_2$ and $Q_3$ configurations, or such builder comprising said alkali metal silicate sorbed onto a particulate inert support substrate. Also, detergent compositing comprising (a) an aqueous solution of an alkali metal silicate having an $SiO_2/M_2O$ molar ratio ranging from about 1.6 to 4, wherein M is an alkali metal, and (b) an inorganic compound which is inert with respect to such silicate and miscible in the aqueous silicate solution, notably an alkali metal carbonate, sulfate, borate, perborate, metasilicate, phosphate or polyphosphate, the inorganic compound constituting from 5% to less than 55% of the total weight of the composition, expressed on a dry basis, and the weight ratio of water remaining associated with the silicate/silicate, expressed on a dry basis, being greater than or equal to 33/100.

14 Claims, No Drawings

$Q_2/Q_3$ ALKALI METAL SILICATE/ INORGANIC COMPOUND DETERGENT BUILDERS

BACKGROUND OF THE INVENTION

1. Field of the Invention

The present invention relates to detergent builder compositions comprising a solution of alkali metal silicates enriched in silicon atoms in $Q_2$ and $Q_3$ form and inorganic compounds which are inert in respect of such silicates. By the term "builder" is intended any active adjuvant which improves the performance of the surface-active agents in a detergent composition.

These builders are especially useful for formulation in pulverulent detergent compositions, in particular washing powders for a washing machine or dishwasher.

The present invention also relates to detergency cogranulates of alkali metal silicate hydrates and alkali metal carbonates.

2. Description of the Prior Art

By "builder" is intended any active adjuvant which improves the performance of the surface-active agents of a detergent composition.

It is known to this art that such builders must elicit what is designated a "softening" effect on the water employed for washing. It must therefore remove the calcium and magnesium which are present in the water in the form of soluble salts and in the soiling of the laundry (i.e., linen) in more or less soluble complex forms. The removal of calcium and magnesium may be carried out by complexing, in the form of soluble species, or by ion exchange, or by precipitation. If precipitation is involved, this must be controlled to avoid deposition thereof (i.e., incrustations) on the linen or on the components of the washing machines.

This control of precipitation is obtained, in particular, using water-soluble polymers which have an affinity for calcium and magnesium.

The builder must also add to the emulsifying action of the surfactants on fatty soiling, a dispersing action on "pigmentary" soiling such as metal oxides, clays, silica, various dusts, humus, limestone or limescale, soot, and the like.

Such dispersing action is generally attained by virtue of the presence of polyanions, contributing a high density of negative charges at the interfaces.

The builder must also contribute an ionic strength which promotes the activity of the surfactants, in particular by increasing micelle size.

It must also provide $OH^-$ ions for the saponification of the fats and also to increase the negative surface charges on the textile surfaces and particulate soiling.

Silicates have long been considered to be good detergency adjuvants, but are currently less employed in phosphate-free washing machine compositions.

The silicates most widely employed for this application are those which have an $SiO_2/Na_2O$ molar ratio ranging from 1.6 to 2.4 or 1.6 to 2.7.

They are marketed either in the form of concentrated solutions at an approximate strength of 35%–45% by weight solids content, or in the form of spray-dried or pulverized and optionally compacted silicate powders.

The concentrated commercial solutions are in most instances prepared from so-called "vitreous", completely amorphous silicate, also known as "soluble glass."

These soluble glasses are rendered water soluble (i.e., hydrosolubilized) in an autoclave under pressure at 140° C.

Commercial solutions are thus produced which have a dry solids content of approximately 45% by weight in the case of a silicate of ratio 2 and approximately 35% in the case of a silicate of ratio 3.5.

The concentrated silicate solutions are introduced by the washing powder formulator (detergent manufacturer) into the aqueous suspension (slurry) containing the other constituents of the detergent washing powder. The slurry is then spray-dried. The silicate, spray-dried together with the other constituents, then contains only approximately 25% or 20% of associated water relative to its dry weight, or even less.

As regards the commercial silicate powder, this is produced by spray-drying concentrated solutions of vitreous silicate; 19% or 20% to 22% by weight of water relative to the finished product must be preserved to ensure good solubility of such product.

It has been determined that, when it is dissolved in a washing bath in a proportion of 1 to 3 g/liter, this silicate powder, which contains only 19% or 20% to 22% by weight of associated water (relative to the finished product) exhibits only weak builder properties.

Indeed, this dissolved silicate powder promotes formation essentially of monomeric silicic (silicon containing) species of formula $Si(OX)_4$, where X is H or Na, having no builder activity. Such monomeric species can associate together to form polyanions only if the silicate concentration is at least 50 to 500 g/liter, and do so slowly.

Such silicate concentrations and the slow kinetics of polymerization of the monomeric species are not compatible with the washing conditions and times in a washing machine.

What has been found in the case of a powder containing from 19% or 20% to 22% of bonded (i.e., chemically associated) water (relative to the final product) is, of course, true in the event of formulations containing a silicate with approximately 20% or 25% of associated water (relative to dry silicate) which are prepared by introducing a concentrated silicate solution into a slurry and then drying it.

SUMMARY OF THE INVENTION

It has now unexpectedly been found that, when an alkali metal silicate in solution is rich in silicon atoms in $Q_2$ and $Q_3$ form, these species, present in the form of polyanions and when diluted to 1 to 3 g/l in a washing medium, have a sufficiently long life permitting them to serve as builders in detergency applications.

The expression "silicon atoms in $Q_2$ and $Q_3$ form" is a representation of the degree of association of the silicon atoms with each other; "$Q_2$" denotes that each silicon atom shares in two —Si—O—Si-bonds, the remaining two bonds being an —Si—O—X end where X is an alkali metal or H; "$Q_3$" denotes that each silicon atom shares in three —Si—O—Si— bonds, the remaining bond being an —Si—O—X end.

Briefly, according to a first embodiment, the present invention features a "builder" for a detergent composition comprising an alkali metal silicate, in particular sodium silicate or potassium silicate, containing at least 30% and preferably at least 50% of the silicon atoms thereof in $Q_2$ and $Q_3$ form.

According to a second embodiment, the present invention features builders for detergent compositions comprising an aqueous solution of an alkali metal, especially sodium or potassium, silicate, having an $SiO_2/M_2O$ molar ratio on the order of 1.6 to 4, and an inorganic compound which is inert in respect of the silicate and miscible in said silicate solution, such compound constituting from 5% to less than 55% of the total weight, expressed on a dry basis, and the weight ratio of the residual water remaining associated with the silicate/silicate, expressed on a dry basis, being greater than or equal to 33/100, preferably 36/100, with M being an alkali metal.

DETAILED DESCRIPTION OF PREFERRED EMBODIMENTS OF THE INVENTION

More particularly according to a first embodiment of the present invention, said silicate advantageously has a $SiO_2/M_2O$ molar ratio on the order of 1.6 to 3.5, preferably on the order of 1.8 to 2.6.

The subject "builder" may be in any form and either may or may not have a defined structure (powder, granules, and the like).

In a first embodiment of the invention, the "builder" comprises an aqueous solution containing about 10% to 60%, preferably about 35% to 50%, by weight of solids of an alkali metal silicate, in particular sodium silicate or potassium silicate, having a $SiO_2/M_2O$ molar ratio on the order of 1.6 to 3.5, preferably on the order of 1.8 to 2.6.

The concentrated alkali metal silicate solution used as the "builder" is preferably prepared by rendering "soluble glasses" water-soluble in an autoclave under pressure at 140° C., followed by dilution if necessary; it may also be prepared by other known means, such as direct attack by concentrated caustic soda solution on sand.

It is determined by NMR analysis that:

(i) a solution having a 45% solids content of vitreous silicate having a $SiO_2/Na_2O$ molar ratio of 2 contains 34% of $Q_3$ species, 51% of $Q_2$ species, 12% of $Q_1$ species and 3% of $Q_0$ species, and (ii) a solution having a 35% solids content and a ratio of 3.5 contains 46% of $Q_3$ species, 27% of $Q_2$ species, 16% of $Q_4$ species, 9% of $Q_1$ species and 2% of $Q_0$ species.

Such "builder" solution may be used via post-addition by spraying it onto the detergent powder at the "bottom of the tower" in the case of a spray installation, or onto the mixture of the components of the detergent formulation in the case of a dry mixture, said spraying being within the limits of the adsorbent capacity of the powders. The pulverulent mixture obtained may be moderately dried if necessary, such that the ratio by weight of dry silicate/water remaining associated with the silicate ranges from 100/120 to 100/40, preferably from 100/90 to 100/50.

The amount of silicate solution which may be used is such that the ratio by weight of dry silicate/detergent powder ranges from 1/100 to 30/100, preferably on the order of 10/100 to 20/100.

In another embodiment of the invention, an aqueous solution containing about 10% to 60%, preferably about 35% to 50%, by weight of solids of an alkali metal silicate, in particular sodium silicate or potassium silicate, having a $SiO_2/M_2O$ molar ratio on the order of 1.6 to 3.5, preferably on the order of 1.8 to 2.6 is adsorbed and/or absorbed on a particulate support which is inert with respect to the silicate, the ratio by weight of silicate expressed on dry basis/residual water remaining associated with the silicate ranging from 100/120 to 100/40, preferably ranging from 100/90 to 100/50.

"Inert" signifies chemically inert.

Water "associated" with the silicate connotes the residual water in the supported solution which is not combined with the inorganic support, in particular in the form of crystalline hydrate.

Exemplary inorganic supports for the silicate solution include compounds which are preferably water-soluble, such as sodium carbonate, sodium sulfate, sodium borate, sodium perborate, sodium metasilicate and phosphates or polyphosphates, such as trisodium phosphate, sodium tripolyphosphate, and the like, these supports being used either alone or as a mixture with one another.

The support generally represents on the order of 55% to 95%, preferably on the order of 65% to 85%, of the weight of he supported solution, expressed as solids content (namely, weight of solution expressed as solids+weight of support).

The supported solution may be prepared by adsorption and/or absorption by contacting a concentrated aqueous solution of an alkali metal silicate having a $SiO_2/M_2O$ molar ratio on the order of 1.6 to 3.5, preferably on the order of 1.8 to 2.6, and having a solids content on the order of 10% to 60%, preferably on the order of 35% to 50%, with an inorganic support which is inert with respect to the silicate, said support being present in an amount such that the amount of water remaining associated with the silicate after adsorption and/or absorption corresponds to a ratio by weight of silicate expressed on dry basis/water associated with the silicate on the order of 100/120 to 100/40, preferably on the order of 100/90 to 100/50.

The contacting operation may be effected by addition, in particular by spraying, of the concentrated silicate solution onto the support in particulate form, in any known high-shear mixer, in particular of the Lodige® type, or in granulating equipment (drum, plate and the like) and the like, at a temperature on the order of 20° to 95° C., preferably on the order of 70° to 95° C.

The supports which may be used are those indicated above.

The amount and the concentration of the silicate solution to be used depend on the absorbent and/or adsorbent capacity of the support, taking into account any possibility for said support to form, in particular, crystallizable hydrates; the water fraction not associated with the silicate, which may be in hydrate form in the support, may be determined in known manner by differential thermal analysis or by quantitative X-ray diffraction. Any water combined with the support in forms other than defined hydrates may be determined by suitable physicochemical techniques (thermoporosimetry, thermogravimetric analysis, proton NMR, IR).

The limits of the adsorbent and/or absorbent capacity of the support may be determined by known techniques, for example by measuring the change in the angle at the base of the natural slope as a function of the proportion in which the silicate solution is added.

If necessary, the mixture of the support and the silicate solution may itself be dried, but moderately, such as to provide the desired proportions of water associated with the silicate.

The particles of supported silicate solution obtained may be ground, if desired, to provide an average diameter on the order of 200 to 800 micrometers.

Alkali metal silicate solutions in adsorbed and/or absorbed form on an alkali metal carbonate which are in the form of spherical cogranules of hydrated alkali metal silicate and alkali metal carbonate are "builders" according to the invention which elicit a very particularly good performance.

Such spherical cogranules of hydrated alkali metal silicates and alkali metal carbonates may be prepared by a process comprising:

(a) spraying an aqueous solution based on alkali metal silicates or based on a mixture of alkali metal silicates and alkali metal carbonates onto a rolling bed of particles based on alkali metal carbonates tumbling in a rotary granulating device, the speed of motion of the particles, the thickness of the rolling bed and the flow rate of the sprayed solution being such that each particle is converted into a plastic cogranule on contacting other particles.

(b) subjecting the cogranules obtained to a densification operation, and (c) drying said densified cogranules until a content of water associated with the silicate corresponding to a ratio by weight of silicate expressed on dry basis/water associated with the silicate on the order of 100/120 to 100/40 is attained.

Particularly exemplary alkali metal silicates and alkali metal carbonates include sodium silicate and carbonate and potassium silicate and carbonate, and very especially sodium silicate and carbonate.

The sprayed aqueous solution based on silicate or silicate/carbonate mixture may have a solids content on the order of 30% to 55% by weight, preferably of 30% to 45% by weight; said alkali metal silicate has a $SiO_2/M_2O$ molar ratio on the order of 1.6 to 3.5, preferably on the order of 1.8 to 2.6 and very particularly close to 2. The carbonate may optionally be present in proportions depending on the desired end product.

Spraying of the solution based on silicate or silicate/carbonate mixture is carried out at a temperature on the order of 20° to 95° C., preferably on the order of 70° to 95° C. The spraying may be promoted by the conjoint introduction (for example using a two-fluid nozzle) of air under pressure at a temperature on the same order.

The particles used to prepare the cogranules are principally an alkali metal carbonate having:

(a) an average diameter on the order of 10 to 150 microns, preferably on the order of 20 to 100 microns and very particularly close to 30 to 80 microns, (b) an unsettled packing density (non-bulk density) on the order of 0.4 to 1.1 g/cm$^3$, preferably on the order of 0.6 to 1.1 g/cm$^3$, (c) a water content on the order of 0.05% to 0.4%, preferably on the order of 0.1% to 0.3% by weight, and (d) a proportion of insoluble matter on the order of 5 to 100 mg/kg, generally on the order of 10 to 60 mg/kg.

Common ground or unground grades of carbonate may be used.

In addition to these carbonate particles, small amounts (less than 10% of the weight of the cogranules) of other particles may be present, such as anti-redepositing polymers (carboxymethyl cellulose and the like), enzymes and the like, commonly used in the detergent field and having a diameter and a density close to those of the carbonate particles.

The apparatus used to carry out the cogranulation operation by means of spraying may be any rotary device of the rotating plate, rotating dish or drum or mixer/granulator type, and the like.

A first preferred method for the production of these cogranules entails using a rotary granulator permitting movement of the particles as a thin layer. Dishes having an axis of rotation inclined to the horizontal at an angle of more than 20° C., preferably more than 40°, are particularly suitable; their geometry may be very diverse: truncated cone, flat, stepped, a combination of these three shapes, and the like.

A second preferred method for the production of these cogranules entails using a rotary drum, the angle of inclination of which is at least 3% and preferably at least 5%.

The carbonate-based particles are in motion at a temperature on the order of 15° to 200° C., preferably on the order of 15° to 120° C. and very particularly on the order of 15° to 30° C.

The amounts of solution based on silicate or silicate/carbonate mixture to be sprayed and of carbonate-based particles to be used correspond to a liquid flow rate/particle flow rate ratio which can range from 0.2 to 0.8 l/kg, preferably from 0.4 to 0.7 l/kg and very particularly from 0.62 to 0.7 l/kg, these values being expressed in terms of the sodium salts.

The flow rate of the sprayed solution, the speed at which the particles travel and the thickness of the layer of travelling particles are such that each particle absorbs liquid and agglomerates with other particles with which it comes into contact, in order to produce plastic granules and not a paste.

The speed at which the particles travel and the thickness of the layer are controlled by the flow rate at which the particles are introduced into the granulating device and by the characteristics of the latter.

The residence time of the particles in a device of the plate or drum type is generally on the order of 15 to 40 minutes.

One skilled in this art may easily adapt the characteristics of the apparatus used to the desired product depending on a given starting material; namely, for a dish;

(i) its geometry (truncated cone, flat, stepped or a combination of the three shapes), (ii) its dimensions (depth, diameter), (iii) its angle of inclination, (iv) its speed of rotation, and (v) the relative positions of the solid and liquid feeds.

For a drum:

(i) its geometry (tube diameter), (ii) its angle of inclination, (iii) its speed of rotation, (iv) the tube charge, and (v) the relative positions of the solid and liquid feeds.

The undensified and undried cogranules obtained have characteristics which depend on the conditions used to effect granulation. They generally have:

(a) a silicate content on the order of 7% to 30% by weight, preferably on the order of 11% to 23% by weight, and very particularly on the order of 21% to 23% by weight, (b) a carbonate content on the order of 41% to 75% by weight, preferably on the order of 48% to 64% by weight and very particularly on the order of 48% to 51% by weight, and (c) a water content on the order of 18% to 29%, preferably on the order of 25% to 29%, by weight, and very particularly on the order of 27% to 29% by weight.

The densification operation may be carried out at ambient temperature by rolling the cogranules obtained in the granulation step in a rotary device.

This device is preferably independent of the granulating device.

This densification step may advantageously be carried out by introduction and residence of the cogranules in a rotary drum. The angle of inclination of the latter is at least 3%, preferably at least 5%. The dimensions of this drum, its speed of rotation and the residence time of the cogranules depend on the density desired; the residence time is generally on the order of 20 minutes to 3 hours, preferably on the order of 20 to 90 minutes.

Mixer/granulators are also suitable for this densification operation.

The cogranulation and densification operations may also be carried out in the same device, for example in a stepped dish, the densification of the cogranules being obtained by rolling said cogranules on the final steps of the apparatus; similarly, these two operations may be carried out in a two-section drum.

The densified cogranules are then dried by any known means. A particularly highly efficient method is drying in a fluidized bed with the aid of a stream of air at a temperature on the order of 40° to 90° C., preferably of 60° to 80° C. This operation is carried out for a period of time which depends on the temperature of the air, the water content of the cogranules at the outlet of the granulation device and that desired for the dried cogranules, as well as on the fluidization conditions; those skilled in this art may easily adapt these various conditions to the desired product.

The dried dense cogranules generally have:

(a) a silicate content on the order of 8% to 38% by weight, preferably on the order of 14% to 31% by weight, and very particularly on the order of 24% to 31% by weight, (b) a carbonate content on the order of 47% to 87% by weight, preferably on the order of 59% to 81% by weight, and very particularly on the order of 64% to 69% by weight, (c) a water content on the order of 5% to 25% by weight, preferably on the order of 7% to 20% by weight, and very particularly of 12% to 20% by weight, (d) a non-bulk density on the order of 0.7 to 1.5 $g/cm^3$, preferably on the order of 0.75 to 1.5 $g/cm^3$ and very particularly on the order of 0.8 to 1 $g/Cm^3$, and (e) a median diameter (in the sense of cumulative percentages passing) on the order of 0.4 to 1.8 mm, preferably on the order of 0.6 to 0.8 mm, with a $\log_{10}$ standard deviation of 0.02 to 0.3, preferably of 0.05 to 0.1.

These cogranulationldensification/drying steps make it possible to produce cogranules which are based on hydrated alkali metal silicates and on alkali metal carbonates and are perfectly spherical, dense and which dissolve rapidly in water.

Spherical cogranules based on hydrated sodium silicates and on sodium carbonate which are particularly suitable for formulation into detergent compositions for a dishwashing machine and a washing machine are those having the following characteristics:

(a) a silicate content on the order of 24% to 31% by weight, (b) a carbonate content on the order of 64% to 69% by weight, (c) a water content of 12% to 20% by weight, (d) a non-bulk density on the order of 0.7 to 1.5 $g/cm^3$, preferably on the order of 0.8 to 1, (e) a median diameter on the order of 0.4 to 0.8 mm, with a $\log_{10}$ standard deviation of 0.05 to 0.1, and (f) a speed of less than 2 minutes for 90% dissolution in water and of less than 4 minutes for 95% dissolution in water.

By "speed for 90% or 95% dissolution in water" is intended the time required to dissolve 90% to 95% of the product at a concentration of 35 g/l in water at 20° C.

When they have a given structure (powder, cogranule, and the like), the "builders" of the invention are formulated into detergent compositions for dishwashing applications in an amount of 3% to 90% by weight, preferably 3% to 70% by weight of such compositions; the amounts used in the compositions for washing machine applications are on the order of 3% to 60%, preferably on the order of 3% to 40% of the weight of these compositions (these amounts are expressed as the weight of dry silicate relative to the weight of the composition).

In addition to the "builder" according to the invention, the detergent composition contains at least one surfactant in an amount which can range from 8% to 20% and is preferably on the order of 10% to 15% of the weight of the composition.

Exemplary such surfactants include:

(i) anionic surfactants of the type comprising alkali metal soaps (alkali metal salts of $C_8$–$C_{24}$ fatty acids), alkali metal sulfonates ($C_8$–$C_{13}$ fatty alkylbenzenesulfonates and $C_{12}$–$C_{16}$ alkylsulfonates), oxyethylenated and sulfated $C_6$–$C_{16}$ fatty alcohols, oxyethylenated and sulfated $C_8$–$C_{13}$ alkylphenols, alkali metal sulfosuccinates ($C_{12}$–$C_{16}$ alkylsulfosuccinates), and the like, (ii) nonionic surfactants of the type comprising polyoxycthylenated $C_6$–$C_{12}$ alkylphenols, oxyethylenated $C_8$–$C_{22}$ aliphatic alcohols, ethylene oxide/propylene oxide block copolymers and optionally polyoxyethylenated carboxylic amides, (iii) amphoteric surfactants of the alkyldimethylbetaine type, and (iv) cationic surfactants of the type comprising alkyltrimethylammonium chlorides or bromides and alkyldimethylethylammonium chlorides or bromides.

Various other constituents may also be incorporated into the detergent composition, such as:

(1) "builders of the type comprising:

(i) phosphates in an amount of at least 25% of the total weight of the formulation, (ii) zeolites in an amount of up to about 40% of the total weight of the formulation, (iii) sodium carbonate in an amount of up to about 80% of the total weight of the formulation, (iv) nitriloacetic acid in an amount of up to about 10% of the total weight of the formulation, and (v) citric acid or tartaric acid in an amount of up to about 20% of the total weight of the formulation, the total amount of "builder" corresponding to about 0.2% to 80%, preferably 20% to 45%, of the total weight of said detergent composition, (2) bleaching agents of the type comprising perborates, percarbonates, chloroisocyanurates and N,N,N',N'-tetraacetylethylenediamine (TAED) in an amount of up to 30% of the total weight of the said detergent composition, (3) anti-redeposition agents of the type comprising carboxymethyl cellulose or methyl cellulose in amounts which can be up to about 5% of the total weight of the said detergent composition, (4) anti-encrustation agents of the type comprising acrylic acid and maleic anhydride copolymers in an amount which can be up to about 10% of the total weight of the said detergent composition, and (5) fillers of the sodium sulfate type for pulverulent detergents in an amount which can be up to 50% of the total weight of the said detergent composition.

In order to further illustrate the first embodiment of the present invention and the advantages thereof, the following specific examples are given, it being understood that same are intended only as illustrative and in nowise limitative.

EXAMPLES 1 TO 5

The "builder" performance characteristics:

(a) of a sodium silicate solution having a $SiO_2/Na_2O$ molar ratio=2 with 45% by weight of dry solids (Example 2), and (b) of a sodium silicate solution having a $SiO_2/Na_2O$ molar ratio=3.4 with 35% by weight of dry solids (Example 4) were determined in a Tergotometre (U.S. Testing Company, Hoboken, U.S.A.), as a binary mixture with a LABS anionic surfactant (linear sodium dodecylbenzenesulfonate marketed by Aldrich), the reflectance measurements being carried out using a Gardner reflectometer.

These performance characteristics were compared with those:

(i) of the LABS alone in a concentration of 2 g/l (Example 1), (ii) of a sprayed silicate powder having a ratio of 2 and containing 22% of water (which is 28.2% of water with respect to the dry silicate) (Example 3), and (iii) of a sprayed silicate powder having a ratio of 3.4 and containing 18.6% of water (which is 22.8% of water with respect to the dry silicate) (Example 5) used under the same conditions (4 g/l).

The results of these determinations are reported in Table I.

Method of Determination

Principle

A simplified machine wash was simulated in a tergotometer by washing standardized test pieces of soiled fabric at 65° C. using a surfactant and the builder to be tested. The wash required 20 minutes and the color of the fabrics was determined before and after washing. A "blank" was carried out by washing the same type of test pieces with the surfactant alone, in order to evaluate the performance of the builder tested.

Method

The tergotometer was an apparatus consisting of 4 stainless steel 2 liter vessels on which pulsators, which were regulated to 100 cycles per minute, were fitted. The vessels were placed in a water tank which was controlled at 65° C.

(1) 1 liter of hard tap water (34° French total hardness) was placed in each vessel.

When the water was at the test temperature, the following were introduced therein:

(i) 5 10×12 cm test pieces of style 405 W white cotton from Test Fabric, (ii) 5 10×12 test pieces of white polyester cotton (PEC), reference no. 7435, from Test Fabric, (iii) 2 10×12 cm test pieces of cotton soiled with EMPA (mixture of Indian ink and olive oil), article 101 from Gallen, (iv) 2 10×12 cm test pieces of cotton soiled with red wine, article 114 from Gallen, and (v) 2 10×12 cm test pieces of polyester cotton (PEC) soiled with EMPA, article 104 from Gallen.

(2) The following 3 operations were carried out simultaneously (i) the stopwatch was started, (ii) agitation was started, and (iii) the builder/surfactant mixture was added.

The builder was tested at 4 g/l (mass calculated as dry material in the product) and 2 g/l of LABS were added thereto.

(3) Rinsing:

When twenty minutes had elapsed, the wash water was discarded and the fabrics were rinsed with 3×1 l of tap water.

(4) Spinning and drying:

The test pieces were spun and predried by spreading them individually in absorbent paper. The fabrics were then passed twice through a rolling machine between two sheets of absorbent paper at a temperature of about 110° C.

(5) Color determination:

The Gardner apparatus was calibrated by zero measurement on a black plate reserved for this purpose and then by reading the values L, a and b on a standardized white plate of the same type as the black. L establishes the color in the shades from white to black.

L=100 corresponds to white test piece

L=0 corresponds to black test piece a establishes the color in the shades from green to red.

a>0: the color tends to red a<0 the color tends to green b establishes the color in the shades from yellow to blue.

b>0: the color tends to yellow b<0: the color tends to blue

After calibration, the determinations proper were carried out. 2 test pieces of each fabric category were withdrawn from each vessel and 5 determinations were carried out per test piece (namely, one at the center and one at the four corners), by placing a heavy metal plate on the fabric, and the arithmetic mean of the 10 determinations was then calculated. The same procedure was used with unwashed fabrics.

(6) Calculation of the results:

DL and DE were calculated for each test and for each type of fabric.

$$DL = L\text{ after washing} - L\text{ before washing}$$

$$Da = a\text{ before washing} - a\text{ after washing}$$

$$Db = b\text{ before washing} - b\text{ after washing}$$

$$DE = \sqrt{DL^2 + Da^2 + Db^2} = \text{detergency}$$

The mean DL and DE for each product and each type of soiled fabric were calculated.

Subsequently, the following were calculated for each product:

Det(ergency) EMPA cotton=mean DE EMPA cotton

Det(ergency) EMPA PEC=mean DE EMPA PEC

Det(ergency) WINE cotton=mean DE WINE cotton

Det(ergency) cumulative=sum of the EMPA cotton, EMPA PEC and WINE cotton detergencies

EXAMPLES 6 AND 7

A Lodige M5G® mixer (marketed by Lodige) was charged with 800 g of $H_2$ anhydrous tripolyphosphate® marketed by Rhône-Poulenc.

After closing the apparatus and commencing rotation at a speed of 400 rev/min, 200 g of a solution of sodium silicate having a $SiO_2/Na_2O$ molar ratio=2 and 45% of solids were introduced by spraying.

This addition required 10 min; after an additional 10 min of mixing by rotation, the product was removed and was permitted to stand for 2 hours on a plate in the open air and at ambient temperature.

The characteristics of the product were as follows:

(a) partially hydrated TPP: 82% by weight, (b) sodium silicate: 9% by weight, (c) water associated with the silicate: 9% by weight, which was 100% with respect to the dry silicate.

The total amount of water contained in the product was determined by measuring the loss in weight of the latter on heating to 500° C.; on the other hand, the amount of water bonded in the form of hydrates was determined by differential thermal analysis. The amount of associated water was calculated from the difference between the total water and water bonded in the form of hydrate.

Average diameter=250 micrometers

The "builder" performance characteristics of this product were determined using the method described above, but replacing the 2 EMPA-soiled PEC, article 104, test pieces by 2 test pieces of cotton soiled with WFK from Krefeld, of the same dimensions (Example 6).

These performance characteristics were compared with those of a mixture of $H_2$ anhydrous TPP® powder and sprayed silicate powder having a $SiO_2/Na_2O$ ratio=2 and containing 22% of water, in a weight ratio of TPP/dry silicate of 800/90, the comparison being made under the same conditions (4 g/l) (Example 7).

The results of the determinations are reported in Table II.

TABLE I

| Example | 1 LABS 2 g/l | 2 LABS 2 g/l $R_2$ solution 4 g/l | 3 LABS 2 g/l Sprayed $R_2$ 4 g/l | 4 LABS 2 g/l $R_{3,4}$ solution 4 g/l | 5 LABS 2 g/l Sprayed $R_{3,4}$ 4 g/l |
|---|---|---|---|---|---|
| Det EMPA cotton | 17.26 | 19.53 | 20.23 | 21.03 | 21.69 |
| Det EMPA PEC | 10.53 | 21.61 | 20.93 | 21.29 | 18.89 |
| Det WINE cotton | 17.28 | 20.48 | 18.44 | 20.09 | 20.28 |
| Cumulative Det | 45.07 | 61.62 | 59.60 | 62.41 | 60.86 |

TABLE II

| Example | 6 LABS 2 g/l $R_2$ solution supported on TPP 4 g/l | 7 LABS 2 g/l Sprayed $R_2$ + TPP 4 g/l |
|---|---|---|
| Det white cotton | −0.20 | 0.06 |
| Det KREFELD cotton | 14.15 | 13.47 |
| Det EMPA cotton | 25.14 | 25.42 |
| Det WINE cotton | 19.67 | 18.77 |
| Cumulative Det | 58.96 | 57.66 |

EXAMPLE 8

The granulating system comprised a flat plate 800 mm in diameter and 100 mm deep. During granulation, the speed of rotation was on the order of 35 rev/min and the inclination of the axis of rotation relative to the horizontal was on the order of 55°. The granulating plate was fed continuously at a flow rate of 21.4 kg/h with a powder of fine particles of sodium carbonate, the principal characteristics of which were as follows:

(a) alkalinity titer: 99.61%, (b) water content (by weight)=0.12%, (c) non-bulk density=0.56 g/cm$^3$ (d) median diameter=95 microns, (e) insoluble matter content=58 mg/kg.

With the aid of air at 80° C., a solution of sodium silicate was sprayed at a flow rate of 13.4 l/h at a temperature of 80° C. onto this powder, which was rotated in the granulating dish, via a two-fluid nozzle located at a distance of 20 cm from the bottom of the dish. The proportion of active material and the $SiO_2/Na_2O$ molar ratio of the sprayed solution were, respectively, 43% (by weight) and 2.

The average residence time of a particle in the plate was about 10 to 15 min. The temperature of the particles on leaving the plate was ambient temperature.

The granules which leave the plate were introduced into a smooth-walled rotary tube 500 mm in diameter and 1,300 mm long which had an inclination on the order of 5%. The outlet diaphragm was adjusted such that the average residence time of a particle was about 40 min. The speed of rotation of the drum (18 rev/min) was selected such as to provide a rolling bed of particles, which promote the densification of the latter.

The granules thus obtained were dried in a fluidized bed at a temperature on the order of 80° C. (the temperature of the fluidizing air was 85°–90° C.) for 10 to 15 min.

The product dried in this manner had the following characteristics:

(i) carbonate content (by weight)=65%, (ii) silicate content (by weight)=21%±0.5%, (iii) water content (by weight)=13.5%, (iv) non-bulk density=0.90 g/cm$^3$, (v) % by weight oversize at 1 mm=10.8%, (vi) median diameter=0.73 mm, (vii) % by weight exiting at 0.2 mm=6%, (viii) 90% (by weight) of the product dissolved in 50 s (35 g/l aqueous solution at 20° C.), (ix) 95% (by weight) of the product dissolved in 65 s (35 g/l aqueous solution at 20° C.), (x) whiteness L=96.3, (xi) abrasion resistance: 7%.

The granules had excellent stability on storage.

Determination of Abrasion Resistance

Apparatus

A fluorometer, a standardized apparatus used to qualify hydraulic binders and described in French Standard P 15-443, was used.

Method

Sieve 50 g of product between 1,200 and 180 micron sieves using a Roto-Lab® laboratory sieve apparatus (marketed by Prolabo).

Recover the fraction sized between 180 and 1200 microns.

Accurately weight about 25 g of the product to be tested; this is M, the precise weight.

Place the latter in the fluorometer.

Weigh an empty and dry Soxlet®-type filter (marketed by Prolabo) and place it on the upper part of the fluidization tube; its mass is M1.

Fluidize for 5 min (flow rate of dry air: 15 l/min).

Recover the product conveyed into the filter and any fines deposited on the vertical walls of the fluidization tube, using a scraper of suitable diameter. Weigh; this is M2, the mass of these fines and of the filter.

Resieve the residue in the bottom of the fluidization tube in the Roto-Lab® and recover, for weighing, the fines smaller than 180 microns; this is M3, the mass of these fines.

Calculation Expression of the Result

The degree of abrasion is equal to the percentage of fines 180 microns formed during the time for which the product is fluidized.

$$\text{Abrasion \%} = \frac{(M3 + M2 - M1)}{M} \times 100$$

EXAMPLE 9

The operations described in Example 1 were repeated, with the following modifications only:

Granulation (i) granulating plate: speed of rotation of 30 rev/min, (ii) powder feed: 22 kg/h, and (iii) silicate solution feed: 13 l/h.

Densification speed of rotation of the drum: 10 rev/min.

Drying in the Fluidized Bed (i) temperature=90° C., (ii) time: 20 min.

The dried product had the following characteristics:

(i) carbonate content (by weight)=60.9%, (ii) silicate content (by weight)=22.9%±0.5%, (iii) water content (by weight)=16.1%, (iv) non-bulk density=0.86 g/cm$^3$, (v) % by weight oversize at 1 mm=2.6%, (vi) median diameter=0.64 mm, (vii) % by weight exiting at 0.2 mm=7.3%, (viii) 90% (by weight) of the product dissolved in 75 s (35 g/l aqueous solution at 20° C.), (ix) 95% (by weight) of the product dissolved in 102 s (35 g/l aqueous solution at 20° C.), (x) whiteness L=95.6, and (xi) abrasion resistance: 9.2%.

The granules had excellent stability on storage.

EXAMPLE 10

The granulating system comprised a smooth-walled drum rotating at 40 rev/min, 500 mm in diameter and 1,300 mm long, having an inclination on the order of 7.5%. The outlet diaphragm was adjusted such that the average residence time of a particle was on the order of 15 to 20 min.

The drum was fed continuously at a flow rate of 37 kg/h with a carbonate powder having the same characteristics as those of the powder of Examples 1 and 2.

With the aid of air at 80° C., a silicate solution (containing a proportion of active material of 45.6% by weight and having a weight ratio of $SiO_2/Na_2O$ of 2) was sprayed at 80° C. with a flow rate of 18 l/h onto this powder, which was rotated in the drum, via a flat-jet-two-fluid nozzle located in the first third of the drum.

The cogranules at the outlet of the drum were at ambient temperature and had a density of 0.68 g/cm$^3$.

The cogranules were then densified discontinuously for one hour in a smooth-walled rotary drum 500 mm in diameter and 1,300 mm long, having an inclination of 5%.

The speed of rotation of the drum was 20 rev/min.

The granules thus obtained were dried in a fluidized bed at a temperature on the order of 65° C. (the temperature of the fluidizing air was 70° C.) for 15 min.

The dried product had the following characteristics:

(i) carbonate content (by weight)=62%, (ii) silicate content (by weight)=20.5%±0.5%, (iii) water content (by weight)=17.6%, (iv) non-bulk density=0.820, (v) % by weight oversize at 1 mm=5%, (vi) median diameter=0.65 mm, (vii) % by weight exiting at 0.2 mm=0.6%, (viii) 90% (by weight) of the product dissolved in 50 s (35 g/l aqueous solution at 20° C.), (ix) 95% (by weight) of the product dissolved in 63 s (35 g/l aqueous solution at 20° C.).

The granules had excellent stability on storage.

EXAMPLE 11

The operations described in Example 3 were repeated, with the following modification only:

Discontinuous for 2 hours.

The dried product had the following characteristics:

(i) carbonate content (by weight=60.8%, (ii) silicate content (by weight)=19.3%±0.5%, (iii) water content (by weight)=19.9%, (iv) non-bulk density=0.91 g/Cm$^3$, (v) % by weight oversize at 1 mm=1.6%, (vi) median diameter=0.57 mm, (vii) % by weight exiting at 0.2 mm=1.22%, (viii) 90% (by weight) of the product dissolved in 37 s (35 g/l aqueous solution at 20° C.), and (ix) 95% (by weight) of the product dissolved in 45 s (35 g/l aqueous solution at 20° C.).

The granules had excellent stability on storage.

EXAMPLES 12 AND 13

The "builder" performance characteristics of the cogranules of Example 8 were determined by the method described in Examples 1 to 5.

They were compared with those of a mixture of sodium carbonate powder and sprayed sodium silicate powder having a $SiO_2/Na_2O$ ratio=2 and containing 22% of water in the finished product (which is 28.2% of water with respect to the dry silicate) in a weight ratio of 3/1 (carbonate/atomized $R_2$).

The results are reported in Table III.

The amounts of carbonate and of silicate reported in this table are expressed on a dry basis.

It was found that the performance characteristics of the cogranules were better than those of a mixture of powders having the same silicate/carbonate ratio.

EXAMPLE 14

Particles were prepared from:

(a) 1,800 g of pulverulent lightweight sodium carbonate having an average diameter on the order of 110 $\mu$m, and (b) 1,200 g of a solution of sodium silicate having a $SiO_2/Na_2O$ molar ratio=3.4 and a solids content of 37%, in a Lodige M5G® mixer, using the method of Examples 6 and 7.

After adding the silicate solution for 5 minutes, mixing for an additional 5 minutes and standing in the open air for 2 hours at ambient temperature, a product was recovered which had the following characteristics:

(i) sodium carbonate: 60% by weight, (ii) silicate=20% by weight, (iii) water associated with the silicate=20% by weight (which is 100% with respect to the dry silicate), (iv) average diameter=400 μm.

This product was introduced by dry mixing into additives in order to obtain the following laundry detergent composition:

| Composition of the detergent | parts by weight |
|---|---|
| (a) linear alkylbenzenesulfonate | 25 |
| (b) Cemulsol DB 618 ® | 3 |
| (c) Cemulsol LA 90 ® (surfactants from S.F.O.S.) | 2 |
| (d) zeolite 4A | 18 |
| (e) product from Example 14 | 25.8 |
| (f) Sokalan CP5 ® (copolymer from BASF) | 4 |
| (g) carboxymethylcellulose | 1.5 |
| (h) Tinopal DMSX | 0.2 |
| (i) Timopan SOP (brighteners from Ciba-Geigy) | 0.2 |
| (j) Esperase ® (enzyme from Novo) | 0.3 |
| (k) Rhodorsil 20444 ® (anti-foam from RhÔne-Poulenc) | 2 |
| (l) Na perborate.4$H_2O$ | 15 |
| (m) TAED | 3 |
| (n) pH (10 g/l) = 10.25 | |

The performance test for soil removal was carried out in a FOM 71® washing machine from Wascator.

The test conditions were as follows:

(i) cycle used: 60° C., (ii) total duration of the cycle: 70 minutes, no pre-wash, (iii) number of cycles: 3 per detergent, (iv) water hardness: 32° French water hardness, (v) laundry load: 3.5 kg of white cotton cleaning rags, (vi) fabrics tested: per wash, the following two series of fabrics were introduced by pinning them to cleaning rags:

| | |
|---|---|
| Grey cotton: | Test-Fabric Krefeld 10 C |
| | IEC 106 |
| | EMPA 101 |
| Polyester/grey cotton: | Test-Fabric Krefeld 20 C |
| | EMPA 104 |
| Protein stains: | Blood (EMPA 111) |
| | Cocoa (EMPA 112) |
| | Mixed (EMPA 116) |
| Oxidizable stains: | Tea (Krefeld 10 G |
| | Unbleached cotton cloth (EMPA 222) |

Detergent Dosages

1st series: 5 g/l, which is 5×20=100 g per wash

2nd series: 8 g/l, which is 8×20=160 g per wash

Method for Determination of Soil and Stain Removal

Photometric determinations (determinations of the amount of light reflected by the fabric) enabled the percentage soil removal to be calculated. An Elrepho 2000 apparatus from Datacolor was used.

The soil removal is expressed by the equation:

$$\text{Removal in } \% = \frac{C - B}{A - B} \times 100$$

A=reflectance of the white reference sample

B=reflectance of the soiled reference sample

C=reflectance of the soiled sample after washing

The reflectances were determined with the aid of the blue trichromatic component, without the action of optical brighteners.

Number of measurements carried out per sample=4

Number of samples per wash=2

Number of washes=3

This is equivalent to 4×2×3=24 measurements per soil, per product and per concentration studied.

The antiencrustation performance test in a washing machine was carried out in a Schultess Super 6 De Luxe® drum machine.

The test conditions were as follows:

(i) cycle used: 60° C., (ii) total duration of the cycle=65 minutes; no pre-wash, (iii) number of cycles: 25 cumulative washes, (iv) water hardness: 21.2° French water hardness, (v) test fabric used: reference strip corresponding exactly to the specifications given in the Standard NFT 73.600, (vi) laundry load: 3 kg of 100% cotton, (vii) terry towelling, (viii) detergent dosages: 5 g/l.

The test pieces which had been subjected to 25 washes were dried: they were weighed and calcined at 900° C.

The % by weight of ash relative to the weight of the initial test pieces was determined.

The results of the various tests are reported in Table IV.

EXAMPLE 15

A detergent analogous to that of Example 14 was prepared by replacing the "builder" mixture zeolite 4A+product of Example 14+Sokalan CP5 by the following "builder" mixture:

| | |
|---|---|
| (a) zeolite 4A | 30 parts |
| (b) sprayed silicate $R_2$ | 3 |
| (c) lightweight carbonate | 6 |
| (d) sodium sulfate | 4.8 |
| (e) Sokalan CP5 | 4 |

The results of the soil removal and anti-caking tests are reported in Table IV.

EXAMPLES 16 TO 18

The product of Example 8 was introduced, by mixing in a Lodige M5G®, into additives in order to obtain dishwashing compositions.

These compositions are reported in Table V.

These compositions were tested in a Miele® domestic dishwasher, the water softener of which was not regenerated; because of this it supplied a hard water having a total hardness of 30° French water hardness.

cumulative washes of initially perfectly clean plates of soda-lime glass were carried out with each composition, used in a concentration of 3 g/liter of water.

The plates were then subjected to photometric measurement using a Gardner apparatus, identical to that used in Examples 1 to 5.

The total amount of Light L reflected by the sample was determined.

If L was between 4 and 7, the result was considered good, the glass was clear.

If L was between 7 and 14, a slight haze was visible.

The product of Example 8 was compared in a formulation fairly close to a mixture of cogranules of sodium carbonate and cogranules of Britsil H20® (having a $SiO_2/Na_2O$ ratio=2 and containing 20% of water—marketed by Philadelphia Quartz).

The results are reported in Table V.

It was found that the use of cogranules of Example 8 enabled the amount of sodium citrate (expensive) and polyacrylate (not biodegradable) to be reduced.

TABLE III

| Example | 12 LABS 2 g/l cogranules 4 g/l | 13 LABS 2 g/l carbonate 3 g/l $R_2$ ato 1 g/l |
|---|---|---|
| Det EMPA cotton | 19.27 | 17.63 |
| Det EMPA PEC | 24.52 | 23.13 |
| Det WINE cotton | 19.20 | 19.49 |
| CUMULATIVE DET | 62.99 | 60.24 |

TABLE IV

| Example | 14 | 15 |
|---|---|---|
| Det cotton 5 g/l | 57.7 | 50.5 |
| Det cotton 8 g/l | 62.5 | 56.2 |
| Det PEC 5 g/l | 38.4 | 36.6 |
| Det PEC 8 g/l | 46.7 | 44.5 |
| Det protein 5 g/l | 42.6 | 46.6 |
| Det protein 8 g/l | 50.8 | 54.1 |
| Whitening 5 g/l | 43.9 | 37.3 |
| Whitening 8 g/l | 57.9 | 45.3 |
| Encrustation 5 g/l | 0.69 | 0.85 |
| General average 5 g/l | 45.65 | 42.75 |
| General average 8 g/l | 54.47 | 50.02 |

TABLE V

| Example | 15 | 16 | 17 |
|---|---|---|---|
| Cogranule of Example 8 | 59 | 54 | — |
| Cogranulated sodium carbonate | — | — | 31 |
| Britsil H 2 O ® | — | — | 17 |
| Sodium citrate | 17 | 20 | 25 |
| Sodium polyacrylate molecular weight = 4500 | 4 | 5 | 5 |
| Sodium sulfate | 4 | 5 | 6 |
| Nonionic surfactants | 2 | 2 | 2 |
| Sodium perborate.$1H_2O$ | 10 | 10 | 10 |
| TAED | 2 | 2 | 2 |
| Enzymes | 2 | 2 | 2 |
| L | 5.3 | 5.2 | 5.2 |

According to the second embodiment of the invention, inorganic compounds which are inert vis-a-vis the silicate and miscible in the aqueous solution of silicates are preferably water-soluble. Exemplary such compounds include alkali metal carbonate, sulfate, borate or metasilicate polyphosphate such as sodium carbonate, sodium sulfate, sodium borate, sodium perborate, sodium metasilicate, phosphates or polyphosphates such as trisodium phosphate, sodium tripolyphosphate, etc., these compounds being present either alone or in admixture with each other.

Compounds which have an activity in detergency, and more particularly sodium carbonate, are preferably employed.

The inorganic compound constitutes from 5% to less than 55%, preferably from 20% to 40%, of the total weight, expressed on a dry basis, namely, of the sum of the weights of the solution expressed on a dry basis and of the inorganic compound.

The inorganic compound is either introduced directly into the aqueous solution of alkali metal silicate or introduced into water and then subsequently mixed with the aqueous solution of the alkali metal silicate.

The builders according to the invention may be in any form whatever, structured (powder, granules, etc.) or otherwise.

Said silicate may have an $SiO_2/M_2O$ molar ratio on the order of 1.6 to 4, preferably on the order of 1.8 to 3.5.

In a preferred embodiment of the invention, builder compositions comprise an aqueous solution containing approximately 10% to 60%, preferably approximately 35% to 50% by weight solids content of an alkali metal, especially sodium or potassium, silicate.

The concentrated alkali metal silicate solution employed in the builder is preferably obtained by hydrosolubilization of "soluble glasses" in an autoclave under pressure at 140° C., optionally followed by dilution; it can also be obtained by other known means, such as the direct digestion of sand using caustic soda in concentrated solution.

It is found by NMR analysis that:

(a) a solution with 45% solids content of vitreous silicate of molar ratio $SiO_2/Na_2O$=2 contains 34% of $Q_3$ species, 51% of $Q_2$ species, 12% of $Q_1$ species and 3% of $Q_0$ species;

(b) a solution with 35% solids content of ratio 3.5 contains 46% of $Q_3$ species, 27% of $Q_2$ species, 16% of $Q_4$ species, 9% of $Q_1$ species and 2% of Q species.

By water "associated" with the silicate is intended the residual water in said aqueous solution which has not combined with the inorganic compound, especially which is not in crystalline hydrate form.

The weight ratio of residual water remaining associated with the silicate/silicate, expressed on a dry basis, which must be higher than or equal to 33/100, preferably 36/100, corresponds to the necessity of being in the presence of silicates in polyanionic forms. One skilled in this art can easily determine the upper limit of such ratio, this limit corresponding, of course, to the limits in the event that a silicate is maintained in free-flowing pulverulent form, namely, suitable for detergency applications. For example, the weight ratio of water remaining associated with the silicate/silicate, expressed on a dry basis, must be less than or equal to approximately 120/100.

The high silicate content in the compositions of the present invention permit attaining, in particular, very satisfactory anti-incrustation performance on linen or on components of washing machines.

When present in an unstructured form and especially in solution, the builders can be employed as post-addition by spraying onto the "tower bottom" washing powder in the case of a spraying plant, or onto the mixture of the components of the washing formulation in the case of a dry mix, this being within the limit of the adsorbency of the powders present. The pulverulent mixture obtained can be dried moderately, if need be, such that the weight ratio of water remaining associated with the silicate/silicate, expressed on a dry basis, remains higher than or equal to 33/100, preferably 36/100.

The amount of silicate solution in this builder in solution which may preferably be used corresponds to a dry silicate/washing powder weight ratio of from 1/100 to 30/100, still more preferably to a ratio of approximately 10/100 to 20/100.

When it is in a structured form, the builders of the present invention may especially be prepared by contacting an aqueous solution (A) comprising a mixture of a concentrated aqueous solution of an alkali metal silicate (1) having an $SiO_2/M_2O$ molar ratio on the order of 1.6 to 4, preferably on the order of 1.8 to 3.5, and of a dissolved inorganic compound (2), the inorganic compound being inert vis-a-vis the silicate and miscible in the aqueous solution (1) and constituting from 5% to less than 55% as total weight, expressed on a dry basis, with a compound (B) having a composition which is identical to the aqueous solution (A) indicated above, such that the weight ratio of water remaining associated with the total silicate/total silicate, expressed on a dry basis, after the contacting, is greater than or equal to 33/100, preferably 36/100.

As utilized herein, "M" denotes an alkali metal, unless otherwise indicated.

The aqueous solution (A) can be prepared via any known technique. It may in particular be prepared by introducing the inorganic compound, in powder or liquid form, into the aqueous silicate solution.

By "compound (B) having a composition which is identical with the aqueous solution (A)" is intended any compound containing an alkali metal silicate and an inorganic compound as defined above, the inorganic compound constituting from 5% to less than 55% of the total weight, expressed on a dry basis. This compound (B) preferably has a weight ratio of water remaining associated with the silicate/silicate, expressed on a dry basis, which is greater than or equal to 33/100, preferably 36/100.

This compound (B) can be obtained by any known technique. Thus, it can especially be obtained by drying a solution identical with the aqueous solution (A). This drying is preferably controlled such as to preserve the desired proportions of water associated with the silicate, i.e., the weight ratio of water remaining associated with the silicate/silicate, expressed on a dry basis, is greater than or equal to 33/100, preferably 36/100.

In the aqueous solution (A), the concentrated aqueous solution of alkali metal silicate preferably exhibits a weight ratio of water remaining associated with the silicate/silicate, expressed on a dry basis, which is greater than or equal to 33/100, preferably 36/100.

The "contacting" may be carried out by addition, especially by spraying of (A) onto (B) in any known high-shear mixer, especially of the Lodige® type, or in granulating apparatus (drum, dish, etc.) and the like, at a temperature on the order of 20° to 95° C., preferably on the order of 70° to 95° C.

The inorganic compounds which may be used are those indicated above.

The amount and the concentration of the aqueous solution (A) to be used are a function of the absorptivity and/or adsorptivity of the inorganic compounds present in the solution (A) and the compound (B) with regard to the silicate present in the solution (A) and the compound (B), taking account of a potential possibility in the instance of said inorganic compounds of forming crystallizable hydrates, in particular; the content of water unassociated with the silicate which may be in the form of hydrate in the support can be determined in known manner by differential thermal analysis or by quantitative X-ray diffraction. Water which may be combined with the support in forms other than hydrates can be determined by appropriate physicochemical methods (thermoporosimetry, thermogravimetry, proton NMR, IR).

The limit of absorptivity and/or adsorptivity of said inorganic compounds can be determined by known techniques, for example by measuring the change in the angle of repose at the base of a slip bank as a function of the addition content of silicate solution.

If need be, after this contacting of (A) and of (B) has been carried out, a drying stage may be conducted, this being done in a moderate manner, however, such as to provide the desired proportions of water associated with the silicate.

The alkali metal silicate solutions in adsorbed and/or absorbed form on an alkali metal carbonate and in the form of cogranulates of alkali metal silicate hydrate and of alkali metal carbonate are builders of the invention which are particularly effective. Thus, according to the invention spherical cogranules can be formed wherein an alkali metal is sorbed on an alkali metal carbonate.

Such cogranulates of alkali metal silicate hydrates and of alkali metal carbonates are conveniently produced by a process comprising the following steps:

(a) spraying an aqueous solution of a mixture of an aqueous solution of alkali metal silicate having an $SiO_2/M_2O$ molar ratio on the order of 1.6 to 4, preferably on the order of 1.8 to 3.5, and of an alkali metal carbonate, this carbonate constituting from 5% to less than 55% as total weight, expressed on a dry basis, onto a rolling bed of particles of a composition identical to or essentially the same as that of the sprayed mixture, advancing forward in a rotary granulating device, the speed of forward travel of the particles, the thickness of the rolling bed and the flow rate of the sprayed solution being such that each particle is converted into a plastic cogranule while contacting other particles, (b) optionally drying the cogranules obtained in step (a), these steps being carried out such that the final weight ratio of water associated with the silicate/silicate, expressed on a dry basis, is greater than or equal to 33/100, preferably 36/100.

These cogranulates can be employed as a simple and effective means for introducing silicate and carbonate into washing compositions.

By "particles of a composition essentially the same as that of the sprayed mixture" are intended particles comprising an alkali metal silicate and an alkali metal carbonate constituting from 5% to less than 55% of the total weight, expressed on a dry basis. These particles preferably have a weight ratio of water remaining associated with the silicate/silicate, expressed on a dry basis, which is greater than or equal to 33/100, preferably 36/100.

These particles can be produced by any technique per se known to this art. They can be produced, especially, by drying a solution identical to the aqueous solution of alkali metal silicate and carbonate as indicated above. This drying is preferably controlled such as to maintain the desired proportions of water associated with the silicate, i.e., the weight ratio of water remaining associated with the silicate/silicate, expressed on a dry basis, is greater than or equal to 33/100, preferably 36/100.

The rolling bed of particles of a composition identical to that of the sprayed mixture can also be obtained by initially starting with a dry mixture of carbonate and silicate having a carbonate/silicate ratio, expressed on a weight basis, identical to the sprayed solution, until this bed is completely renewed by the cogranulates obtained (recycling).

The concentrated aqueous solution of alkali metal silicate in the aqueous solution of the silicate/carbonate mixture preferably has a weight ratio of water associated with the silicate/silicate, expressed on a dry basis, which is greater than or equal to 33/100, preferably 36/100.

Among the alkali metal silicates and carbonates, those of sodium and potassium are the preferred, and very particularly those of sodium.

Between the steps (a) and (b), the cogranulates produced in step (a) are preferably subjected to a densifying operation.

In a preferred embodiment of the invention, the silicate solution employed during the preparation of the cogranulates has a silicate solids content on the order of 10% to 60%, preferably on the order of 35% to 50%.

The spraying of the aqueous solution based on the silicate/carbonate mixture is carried out at a temperature on the order of 20 to 95° C., preferably on the order of 70 to 95° C.; it may be promoted by the joint introduction (for example using a twin fluid nozzle) of air under pressure at a temperature on the same order.

The carbonates employed may be those of ordinary grades. Carbonates which dissolve easily and which have a high adsorptivity/absorptivity are preferably employed.

Other than these particles of carbonate/silicate mixture, there may also be present small amounts (less than 10% of the weight of the cogranulates) of other particles, such as antiredepositing polymers (carboxymethyl cellulose, etc.), enzymes, polyacrylates, etc., commonly employed in the field of detergency, which have a diameter and a density close to those of the particles of carbonate/silicate mixture.

The apparatus used to carry out the operation of cogranulation by spraying may be any rotary device of the rotating dish, pelletizer, rotary drum, mixer-granulator or similar type.

A first preferred technique for producing these cogranulates entails using a rotary granulator permitting the particles to travel forward as a thin layer. Pelletizers which have an axis of rotation inclined to the horizontal at an angle greater than 20° C., preferably greater than 40°, are particularly preferred; their geometry may vary greatly: frustoconical, flat, stair-shaped, a combination of these three forms, etc.

A second preferred technique of production of these cogranulates entails using a rotary drum whose angle of inclination is at least 3% and preferably at least 5%.

The particles based on carbonate/silicate mixture advance forward at a temperature on the order of 15° to 200° C., preferably on the order of 15° to 120° C., and very particularly on the order of 15° to 30° C.

The amounts of solution based on silicate/carbonate mixture to be sprayed and of particles based on silicate/carbonate mixture to be used correspond to a ratio of flow rate of liquid/flow rate of the particles (wetting ratio) which may range from 0.05 to 0.8 l/kg, preferably from 0.1 to 0.5 l/kg and very preferably from 0.15 to 0.3 l/kg, these values being expressed as sodium salts.

The flow rate of the sprayed solution, the speed of forward travel of the particles and the thickness of the layer of particles travelling forward are such that each particle absorbs liquid and agglomerates with other particles with which it comes into contact to produce plastic granules and not a paste.

The speed of forward travel of the particles and the thickness of the layer are controlled by the rate of introduction of the particles into the granulating device and by the characteristics of the latter.

The residence time of the particles in a device of the dish or drum type is generally on the order of 15 to 40 minutes.

One skilled in this art, as a function of a given starting material, can easily adapt the characteristics of the apparatus employed to the desired product; namely, in the case of a pelletizer:

(a) its geometry (frustoconical, flat, stair-shaped or a combination of these three forms), (b) its dimensions (depth, diameter), (c) its angle of inclination, (d) its speed of rotation, (e) the relative positions of the solid and liquid feeds.

In the Case of a Drum (a') its geometry (diameter of the tube), (b') its angle of inclination, (c') its speed of rotation, (d') the tube charge, (e') the relative positions of the solid and liquid feeds.

The densifying operation can be carried out at room temperature by rolling, in a rotary device, the cogranulates produced in step (a), i.e., the granulation stage.

This device may be dependent or independent of that for granulation.

Such densification step is advantageously carried out by the introduction and residence of the cogranulates in a rotary drum. The angle of inclination of the latter is at least 3%, preferably at least 5%. The dimensions of this drum, its speed of rotation and the residence time of the cogranulates are a function of the required density; the residence time is generally on the order of 20 minutes to 3 hours, preferably on the order of 20 to 90 minutes.

Mixer-granulators are also well suited for this densifying operation.

The cogranulation and densifying operations can therefore be carried out in the same apparatus, for example in a stair-shaped pelletizer, the densification of the cogranulates being obtained by rolling said cogranulates over the last steps of the apparatus; similarly, these two operations can be carried out in a drum with two sections.

The cogranulates, optionally densified, can therefore be dried by any known means. A particularly effective method is drying in a fluidized bed with the aid of a stream of air at a temperature on the order of 40° to 90° C., preferably from 60° to 80° C. This operation is carried out for a period of time which is a function of the air temperature, of the water content of the cogranulates exiting the granulating device and of that desired in the dried cogranulates, and of the fluidization conditions; one skilled in this art can also easily adapt these various conditions to the desired product.

Cogranulates based on sodium silicate hydrates and sodium carbonate according to the invention, prepared by the process described above and particularly suited for the preparation of detergent compositions for a washing machine and dishwasher, are characterized in that they have:

(1) an alkali metal, especially sodium or potassium, silicate of $SiO_2/M_2O$ molar ratio on the order of 1.6 to 4, adsorbed and/or absorbed on alkali metal carbonate, this carbonate constituting from 5% to less than 55% of the weight of the silicate adsorbed and/or absorbed by the carbonate and the weight ratio of water remaining associated with the silicate/silicate, expressed on a dry basis, being greater than or equal to 33/100, preferably 36/100, (2) a loose bulk density on the order of 0.4 to 1.5 g/cm$^3$, preferably on the order of 0.5 to 1.5 g/cm$^3$, and very preferably on the order of 0.75 to 1 g/cm$^3$, (3) a median diameter (within the meaning of cumulative pass percentages) on the order of 0.4 to 1.8 mm, preferably on the order of 0.5 to 0.8 mm, with a $log_{10}$ standard deviation of 0.02 to 0.5, preferably from 0.05 to 0.3.

The weight ratio of water remaining associated with the silicate/silicate, expressed on a dry basis, must preferably be less than or equal to approximately 120/100.

The process described above, comprising the steps of cogranulation and optionally those of densification and drying, permits production of cogranulates based on alkali metal silicate hydrates and alkali metal carbonates which dissolve quickly in water.

Thus, the rates for 90% and 95% dissolution in water of the cogranulates according to the invention are less than 3 minutes and less than 5 minutes, respectively.

By "a rate for 90% or 95% dissolution in water" is intended the time required to dissolve 90% or 95% of the product at a concentration of 35 g/l in water at 20° C.

When it is structured (powder, cogranulate, etc.), the builders of this invention are used in detergent compositions of a dishwasher in a proportion of 3% to 90% by weight, preferably 3% to 70% by weight, of said compositions; the amounts used in compositions for a washing machine are on the order of 3% to 60%, preferably on the order of 3% to 40%, of the weight of said compositions (these amounts are expressed by weight of dry silicate relative to the weight of the composition).

Other than the builders of the present invention, at least one surface-active agent is included in the washing composition in an amount which may range from 8% to 20%, preferably on the order of 10% to 15%, of the weight of said composition.

Exemplary such surface-active agents include:

(1) Anionic surface-active agents of the alkali metal soap type (alkali metal salts of $C_8$–$C_{24}$ fatty acids), alkali metal sulfonates ($C_8$–$C_{13}$ alkylbenzene sulfonates, $C_{12}$–$C_{16}$ alkyl sulfonates), oxyethylenated and sulfated $C_6$–$C_{16}$ fatty alcohols, oxyethylenated and sulfated $C_8$–$C_{13}$ alkylphenols, alkali metal sulfosuccinates ($C_{12}$–$C_{16}$ alkyl sulfosuccinates), etc.;

(2) Nonionic surface-active agents of the polyoxyethylenated $C_6$–$C_{12}$ alkylphenols, oxyethylenated $C_8$–$C_{22}$ aliphatic alcohols, ethylene oxide/propylene oxide block copolymers, and, optionally, polyoxyethylenated carboxylic amides;

(3) Amphoteric surface-active agents of the alkyldimethylbetaine type;

(4) Cationic surface-active agents of the alkyltrimethylammonium or alkyldimethylethylammonium chloride or bromide type.

Various additives and adjuvants may additionally be formulated in the washing composition, such as:

(a) Builders of the type of:

(i) phosphates in a proportion of less than 25% of the total weight of the formulation, (ii) zeolites up to approximately 40% of the total weight of the formulation, (iii) sodium carbonate up to approximately 80% of the total weight of the formulation, (iv) nitriloacetic acid up to approximately 10% of the total weight of the formulation, (v) citric acid, tartaric acid up to approximately 50% of the total weight of the formulation, the total amount of builder corresponding to approximately 0.2% to 80%, preferably from 20% to 45% of the total weight of said detergent composition;

(b) Bleaching agents of the perborate, percarbonate, chloroisocyanurate and N,N,N',N'-tetraacetylethylenediamine (TAED) type, up to approximately 30% of the total weight of said detergent composition;

(c) Redeposition agents of the carboxymethyl cellulose or methyl cellulose type, in amounts which may range up to approximately 5% of the total weight of said detergent composition;

(d) Anti-incrustation agents of the acrylic acid/maleic anhydride copolymer type, in an amount which may range up to approximately 10% of the total weight of said detergent composition;

(e) Fillers of the sodium sulfate type for detergent powders in an amount which may range up to 50% of the total weight of the said composition.

In order to further illustrate the second embodiment of the present invention and the advantages thereof, the following specific examples are given, it being understood that same are intended only as illustrative and in nowise limitative.

EXAMPLE 19

Synthesis of a Builder

Reagents Employed for this Synthesis (i) Sodium silicate:

Solution with a molar ratio $SiO_2Na_2O$=2.8

Solids content: 45% by weight

Relative density: 1.500

Distribution of the polyanionic species (in molar percentage of silicon): $Q_0$=0.8%, $Q_1$=6.2%, $Q_2$ and $Q_3$=83%, $Q_4$=10%.

(ii) Sodium carbonate:

Anhydrous powder

Loose bulk density: 1.1 g/cm$^3$

Particle size: $d_{50}$=0.5 mm.

Procedure

Predissolved sodium carbonate was added to the sodium silicate solution heated to 80° C. with stirring. In this event the addition of water to sodium carbonate permitted using a mixed solution whose solids content was identical to the solids content of the beginning silicate solution. The mixing was carried out such that the sodium carbonate constituted 30% as total weight expressed on a dry basis of silicate and carbonate.

The mixed solution was dried in the oven as a thin layer at 20 C. for 20 hours. The solid obtained was then milled using a Forplex® mill. The final stage entailed drying in a fluid bed at 30–40° C. such as to provide a solid of the following composition:

The sodium carbonate therefore represented 30% as total weight expressed on dry basis of silicate and carbonate.

The weight ratio of water remaining associated with the silicate/silicate, expressed on a dry basis, was equal to: 49.7/100.

The product had the following properties:

Loose bulk density: 0.8 g/cm$^3$

Particle size: $d_{50}$=0.5 mm, $d_{10}$=0.1 mm, $d_{90}$=1 mm

Dissolution: less than 4 minutes for 99% of dissolved product (conductimetric measurement of the aqueous solution containing 3 g/l of product at 20° C.).

Calcium sequestering capacity: 197 mg of $CaCO_3$ per gram of anhydrous product. This sequestering capacity was evaluated by measuring the residual calcium concentration at a time t=15 minutes, the product to be tested being introduced at a time t=0 into a solution of known calcium concentration (solution buffered at pH 10).

EXAMPLE 20

Production of Cogranulates

The reagents employed were the following:

(i) Sodium silicate solution:
Molar ratio $SiO_2/Na_2O$=2.0
Solids content: 45.5% by wt.
Density=1.54 g/$cm^3$ (ii) Sprayed silicate:
Molar ratio $SiO_2/Na_2O$=2.05
Solids content=20%
Density=0.55 g/$cm^3$
Particle size: $d_{50}$=0.12 mm (iii) Sodium carbonate:
Light soda
Density=0.6 g/$cm^3$
Particle size: $d_{50}$=0.12 mm A solution containing 38% by weight of carbonate (expressed on a dry basis as silicate and carbonate) was prepared at 80° C. by mixing a carbonate solution into the silicate solution of ratio 2. The solids content of the mixed solution thus prepared was 37.7%.

Granulation of this solution was effected in a drum of 1,300 mm length and 500 mm diameter which was rotating at 20 revolutions per minute. Granulation was initiated from a masterbatch of a milled mixture of light carbonate and of sprayed silicate of ratio 2. The carbonate/silicate composition of this mixture was that of the mixed solution. The granulation was carried out in the first section of the drum where the solution was sprayed, via a sprinkler bar, onto the powder bed. The drying was conducted in the second section of the drum, equipped with lifters and purged countercurrentwise with hot air.

The granulation, densification and drying therefore was carried out in the same apparatus. The product exiting the drum was partly recycled to the head of the drum after milling and screening of the cut: 0.2–1.25 mm. Thus, in a steady state, namely, when the initial masterbatch was entirely refreshed by newly manufactured products, the granulation parameters were the following:

(a) Mixed solution feed: 6 to 8 l/h (b) Powder feed (recycling): 50 kg/h (c) Wetting ratio: 0.12 to 0.16 l/kg (d) Drying air flow rate: 110 to 120 $m^3$/h (c) Drying air temperature: 105–110° C.

(f) Mean residence time in the drum: 30–40 min.

Cogranulates were thus recovered, the characteristics of which were as follows:

(i) Carbonate/silicate ratio, expressed on a dry basis=38/62, (ii) Content of water associated with the silicate/silicate, expressed on a dry basis=51/100

(iii) Loose bulk density=0.89 g/$cm^3$, (iv) Particle size: $d_{50}$=0.45 μm, $d_{95}$=0.8 mm, with a $\log_{10}$ standard deviation of 0.37.

The granulates obtained exhibited the following dissolving times:

(1) 90% by weight of the product dissolved in 50 seconds (aqueous solution containing 35 g/l at 20° C.), (2) 95% by weight of the product dissolved in 67 seconds (aqueous solution containing 35 g/l at 20° C.), (3) 99% by weight of the product dissolved in 154 seconds (aqueous solution containing 35 g/l at 20° C.).

By way of comparison, the simple dry initial mixture of carbonate and of sprayed silicate initially constituting the masterbatch, not according to the present invention, exhibited the following dissolving times:

(1') 90% by weight of the product dissolved in 55 seconds (aqueous solution containing 35 g/l at 20° C.), (2') 95% by weight of product dissolved in 108 seconds (aqueous solution containing 35 g/l at 20° C.), (3') 99% by weight of the product dissolved in 266 seconds (aqueous solution containing 35 g/l at 20° C.).

Calcium sequestering capacity: 243–249 mg of $CaCO_3$ per gram of anhydrous product. This sequestering capacity was evaluated as in Example 19.

EXAMPLE 21

Production of Cogranulates

The granulation technique was the same as in Example 20, but the granulator operated in an open loop, i.e., it was charged with the dry carbonate/sprayed silicate mixture and the mixed solution but without recycling of the product obtained. Drying was also simultaneous.

The granulation parameters were as follows:

| | | |
|---|---|---|
| (a) Mixed solution feed: | 6 to 8 | l/h |
| (b) Powder feed: | 30 | kg/h |
| (c) Wetting ratio: | 0.2 to 0.27 | l/kg |
| (d) Drying air flow rate: | 110 to 120 | $m^3$/h |
| (e) Drying air temperature: | 105–110 | ° C. |
| (f) Mean residence time in the drum: | 30–40 | min. |

Cogranulates Were Thus Recovered Whose Characteristics Were As Follows (i) Carbonate/silicate ratio expressed on a dry basis=37/63, (ii) Its content of water associated with the silicate/silicate, expressed on a dry basis=42/100

(iii) Loose bulk density=0.54 g/$cm^3$, (iv) Particle size: $d_{50}$=0.57, $d_{95}$=0.78 mm, with a $\log_{10}$ standard deviation of 0.12.

The granulates obtained exhibited the following dissolving times:

(1) 90% by weight of the product dissolved in 55 seconds (aqueous solution at a concentration of 35 g/l at 20° C.), (2) 95% by weight of the product dissolved in 122 seconds (aqueous solution at a concentration of 35 g/l at 20° C.), (3) 99% by weight of the product dissolved in 300 seconds (aqueous solution at a concentration of 35 g/l at 20° C.).

Calcium sequestering capacity: 245 mg of $CaCO_3$ per gram of anhydrous product. This sequestering capacity was evaluated as in Example 19.

These cogranulates were introduced by dry blending with additives to provide the following composition for a washing machine:

| Detergent composition: | parts by weight: |
|---|---|
| (a) Granulates produced | 40 |
| (b) Sokalan CP5 ® (BASF copolymer) | 4.8 |
| (c) Tixolex 25 ® (RhÔne-Poulenc amorphous silicoaluminate) | 5 |
| (d) Sodium sulfate | 7 |
| (e) TAED | 5 |
| (f) LAB (80%) ® | 6 |
| (g) Synperonic A3 ® | 3 |

-continued

| Detergent composition: | parts by weight: |
|---|---|
| (h) Synperonic A9 ® | 9 |
| (i) Esperase ® (Novo enzyme) | 0.3 |
| (j) Tinopal DMSX ® | 0.2 |
| (k) Tinopal SOP ® (Ciba-Geigy brighteners) | 0.2 |
| (l) Antifoam | 2.5 |
| (m) Carboxymethyl cellulose | 2 |

The performance test for soiling removal was carried out in a Wascator FOM 71 r washing machine.

The test conditions were as follows:

(i) Cycle used: 60° C., (ii) Total cycle duration: 70 minutes; no prewash, (iii) Numbers of cycles: 3 per wash, (iv) Water hardness: 32 French degrees of hardness, (v) Washing load: 3.5 kg of white cotton rags, (vi) Fabrics tested: by washing, two series of the following fabrics were introduced, being pinned to the rags:

| | |
|---|---|
| Grey cotton: | Test Fabric<br>Krefeld 10 C<br>IEC 106<br>EMPA 101 |
| Polyester/grey cotton: | Test Fabric<br>Krefeld 20 C<br>EMPA 104 |
| Protein stains: | Blood (EMPA 111)<br>Cocoa (EMPA 112)<br>Mixed (EMPA 116) |
| Oxidizable stains: | Tea (Krefeld 10 G)<br>Unbleached cotton (EMPA 222)<br>Wine (EMPA 114) |

(vii) Detergent amounts:

1st series: 5 g/l, i.e., 5×20=100 g per wash

2nd series: 8 g/l, i.e., 8×20=160 g per wash

Technique for Measuring the Removal of Soiling and of Stains

Photometric measurements (measurements of the amount of light reflected by the fabric) permitted calculation of the percentages of removal of the soiling. The Datacalor Elrepho 2000 instrument was employed.

The removal of soiling is expressed by the formula:

$$\text{Removal in \%} = \frac{C - B}{A - B} \times 100$$

where

A=reflectance of the control white sample,

B=reflectance of the control soiled sample,

C=reflectance of the soiled sample after washing.

The reflectances were determined with the aid of the blue trichromatic component, without the action of optical brighteners.

Number of measurements performed per sample=4

Number of samples per wash=2

Number of washes=3

That is 4×2×3=24 measurements per soiling, per product and per concentration investigation.

The anti-incrustation performance test in a washing machine was carried out in a Schultess Super 6 De Luxe r drum machine.

The test conditions were as follows:

(a) cycle used: 60° C., (b) total cycle duration=65 minutes; no prewash, (c) number of cycles: 25 cumulative washes, (d) water hardness: 21.2 French degrees of hardness, (e) test fabric used: control strip corresponding precisely to the specifications developed in NFT standard 73.600, (f) wash load: 3 kg of 100% cotton terry towels, (g) detergent dosages: 5 g/l.

Test pieces which had been subjected to 25 washes were dried; they were weighed and calcined at 900° C.

The percent by weight of ash was measured in relation to the initial weight of the test pieces.

The results of the various tests appear in Table VI which follows.

Comparative Example 22

Production of Cogranulates

The granulation system included a drum rotating at 40 revolutions per minute, identical with that described in Example 20. The exit diaphragm was adjusted such that the residence time of a particle was on the order of 15 to 20 minutes.

The drum was continuously charged at a rate of 37 kg/h with a carbonate powder which had the same characteristics as that of the powders of Example 20.

A silicate solution identical with that of Example 20 at 80° C. was sprayed at a flow rate of 18 l/h with the aid of air at 80° C. using a twin fluid, flat jet nozzle situated in the first third of the drum, onto this powder, driven in rotation in the drum.

The cogranulates exiting the drum were at room temperature and had a density of 0.68 g/$cm^3$.

The cogranulates were then densified non-continuously for one hour in a smooth-walled rotary drum of 500 mm diameter and 1,300 mm length and at an inclination of 5%. The speed of rotation of the drum was 20 rev/min.

The granulates thus obtained were dried in a fluidized bed at a temperature on the order of 65° C. (fluidization air temperature equal to 70° C.) for 15 min.

The dried product had the following characteristics:

(i) Carbonate/silicate ratio, expressed on a dry basis=66/34, (ii) Its content of water associated with the silicate/silicate, expressed on a dry basis=61/100, (iii) Calcium sequestering capacity: 285 mg of $CaCO_3$ per gram of anhydrous product. This sequestering capacity was evaluated as in Example 19.

The granulates exhibited an excellent behavior in storage.

These cogranulates were introduced by dry blending with additives in order to provide a composition for a washing machine identical with that described in Example 21 (with the exception of the cogranulate).

The tests of performance in the removal of soiling and incrustations were also carried out using this washing composition.

The results are reported in the following Table VI:

TABLE VI

| | COMPARATIVE EXAMPLE 22 | EXAMPLE 21 |
|---|---|---|
| INCRUSTATIONS 5 G/L | 3.72 | 2.88 |
| WASHING PERFORMANCE | | |
| Grey cotton 5 g/l 40° C. | 32.2 | 32.9 |
| Grey cotton 8 g/l 40° C. | 47 | 41.9 |
| Grey cotton 5 g/l 60° C. | 51.4 | 49 |
| Grey cotton 8 g/l 60° C. | 56.3 | 54.8 |
| | 46.73 | 44.65 |

TABLE VI-continued

| | COMPARATIVE EXAMPLE 22 | EXAMPLE 21 |
|---|---|---|
| Polyester/grey cotton 5 g/l 40° C. | 39.2 | 35.3 |
| Polyester/grey cotton 8 g/l 40° C. | 56.1 | 50.1 |
| Polyester/grey cotton 5 g/l 60° C. | 56.8 | 55.7 |
| Polyester/grey cotton 8 g/l 60° C. | 65.4 | 62.3 |
| | 54.38 | 50.85 |
| Protein stains 5 g/l 40° C. | 38.8 | 34.8 |
| Protein stains 8 g/l 40° C. | 46.3 | 40.2 |
| Protein stains 5 g/l 60° C. | 50.6 | 51 |
| Protein stains 8 g/l 60° C. | 58.6 | 56.4 |
| | 48.58 | 45.60 |
| Oxidizable stains 5 g/l 40° C. | 42.1 | 42.1 |
| Oxidizable stains 6 g/l 40° C. | 59.5 | 55 |
| Oxidizable stains 5 g/l 60° C. | 75.7 | 72.8 |
| Oxidizable stains 8 g/l 60° C. | 83.8 | 82 |
| | 73 | 69.93 |
| GENERAL PERFORMANCE | 55.67 | 52.76 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Storage-stable, free-flowing, dense and rapidly dissolving detergency cobuilder particulates having a non-bulk density ranging from about 0.7 to 1.5 g/cm$^3$ and a median particle diameter ranging from about 0.4 to 1.8 mm, consisting essentially of dried powdery cogranulates, said powdery cogranulates consisting essentially of an aqueous solution of sodium or potassium silicate sorbed onto an at least partially hydrated pulverulent sodium or potassium carbonate crystalline support substrate therefor, at least 30% of the silicon atoms of said sodium or potassium silicate being in the $Q_2$ and $Q_3$ configurations, said $Q_2/Q_3$ sodium or potassium silicate having an $SiO_2/M_2O$ molar ratio ranging from about 1.6 to 3.5, wherein M is sodium or potassium, the amount of said hydrated carbonate support substrate being such that residual water associated with said sodium or potassium silicate provides a ratio by weight of silicate, expressed as dry basis/water associated with said silicate, ranging from about 100/120 to 100/33, the total amount of water present in said powdery cogranulates ranging from 5% to 25%, and said powdery cogranulates having a silicate content ranging from about 8% to 38% by weight and a carbonate content ranging from about 47% to 87% by weight.

2. The detergency cobuilder particulates as defined by claim 1, said ratio by weight of silicate, expressed as dry basis/water associated with said silicate ranging from about 100/120 to 100/36.

3. The detergency cobuilder particulates as defined by claim 1, said ratio by weight of silicate, expressed as dry basis/water associated with said silicate ranging from about 100/120 to 100/40.

4. The detergency cobuilder particulates as defined by claim 1, said $SiO_2/M_2O$ molar ratio ranging from about 1.8 to 2.6.

5. The detergency cobuilder particulates as defined by claim 2, the total amount of water comprising said powdery cogranulates ranging from 12% to 20%.

6. The detergency cobuilder particulates as defined by claim 2, at least 50% of the silicon atoms of said sodium or potassium silicate being in the $Q_2$ and $Q_3$ configurations.

7. The detergency cobuilder particulates as defined by claim 2, having an average particulate diameter ranging from about 200 to 800 micrometers.

8. The detergency cobuilder particulates as defined by claim 1, having a non-bulk density of at least 0.8 g/cm$^3$.

9. The detergency cobuilder particulates as defined by claim 2, having a median diameter ranging from about 0.4 to 0.8 mm.

10. The detergency cobuilder particulates as defined by claim 1, comprising from about 24% to 31% by weight of said sodium or potassium silicate and from about 59% to 81% by weight of said sodium or potassium carbonate.

11. The detergency cobuilder particulates as defined by claim 2, essentially spherical in morphology.

12. In a detergency composition comprising at least one surfactant and at least one detergent builder, which comprises, as at least one detergent builder therefor, the detergency cobuilder particulates as defined by claim 2.

13. The detergency composition as defined by claim 12, further comprising a bleaching agent, an anti-redeposition agent, an anti-encrustation agent, a filler material, or combination thereof.

14. A dishwashing or washing machine aqueous medium comprising a solution of the detergency composition as defined by claim 12.

* * * * *